United States Patent
Zamir

(10) Patent No.: US 10,079,875 B2
(45) Date of Patent: *Sep. 18, 2018

(54) REMOTE CONTEXTUAL ACCESS TO OPERATING SYSTEM DESKTOPS

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,690

(22) Filed: Jun. 5, 2016

(65) Prior Publication Data
US 2017/0026453 A1    Jan. 26, 2017

Related U.S. Application Data

(63) Continuation of application No. 14/169,021, filed on Jan. 30, 2014, now Pat. No. 9,363,305.

(51) Int. Cl.
| | |
|---|---|
| *G06F 15/16* | (2006.01) |
| *H04L 29/08* | (2006.01) |
| *H04L 29/06* | (2006.01) |
| *G06F 17/21* | (2006.01) |
| *G06F 3/0482* | (2013.01) |

(52) U.S. Cl.
CPC .......... *H04L 67/025* (2013.01); *G06F 17/211* (2013.01); *H04L 67/42* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 7,891,000 B1 * | 2/2011 | Rangamani | G06F 21/552 |
| | | | 709/224 |
| 9,455,939 B2 * | 9/2016 | Meisels | H04L 51/08 |
| 2012/0151370 A1 | 6/2012 | Kominac | |
| 2016/0173619 A1 * | 6/2016 | Singleton, IV | H04L 67/16 |
| | | | 709/203 |

OTHER PUBLICATIONS

Mobile PC Monitor, 2013, MMSOFT Design Ltd., Ver 4.0.4.

* cited by examiner

*Primary Examiner* — Brian P Whipple

(57) ABSTRACT

Methods, systems, and techniques for remote contextual access to an operating system desktop are provided. Example embodiments provide a desktop state agent the harvests information from a user's desktop regarding state of various objects such as open documents, recent documents, links, shared links, bookmarks, upcoming events, and/or recent emails. The harvested information is translated to html or other web browser recognized language where possible and uploaded to be accessible to a web server configured to respond to requests for desktop state using a web address. In one embodiment, the RCAS allows access to a user's desktop transparently—without the user needing to take explicit action. Further, a remote mobile device can render the desktop data without using a session or connection to the user's desktop machine and without use of a remote desktop protocol.

20 Claims, 8 Drawing Sheets

REMOTE CONTEXTUAL ACCESS TO OPERATING SYSTEM DESKTOPS

CLAIM OF PRIORITY

This application claims priority to and is a continuation of U.S. patent application Ser. No. 14/169,021, filed on Jan. 30, 2014, entitled "REMOTE CONTEXTUAL ACCESS TO OPERATING SYSTEM DESKTOPS", which is incorporated herein by reference in its entirety.

TECHNICAL FIELD

The present disclosure relates to methods, techniques, and systems for providing access to an operating system desktop executing remotely and, in particular, to methods, techniques, and systems for providing access from a mobile device to contextual information harvested from a running Windows operating system desktop.

BACKGROUND

In many scenarios, mobile device platforms pose problems for presenting comprehensive and powerful user interfaces due to factors such as smaller display real estate, less powerful processing power, intermittent access to networks, and the like. Today's workforce often needs to access files, documents, and various information regardless of where the worker is currently located. For example, a company employee may work some of the time on a laptop or desktop computer system in the office, travel home while still accessing email from, for example, a tablet or smartphone, and then want to resume work when she arrives home using, for example, a different mobile or wired device.

Different solutions have been suggested to address such problems. For example, special user interfaces have been developed with particularized applications that are meant to run more smoothly on mobile, potentially smaller footprint, devices. These interfaces which are native to the mobile device may run efficiently, but they do not guarantee access to all of the types of data that the employee may need.

As another example, centrally managed desktops and software infrastructure along with virtualization have proliferated as a mechanism for enabling people of large and small organizations to be guaranteed access to their data from anywhere. Further, dedicated "stateful" sessions that use remote desktop protocols such as Remote Desktop Protocol (RDP), Virtual Network Computing (VNC), or PCoIP (PC over IP) enable workers to essentially "log in" to their desktops remotely. Use of these protocols to access a physical desktop (as opposed to a virtual desktop) require the computer hosting the desktop to remain powered on.

Similar (virtualization) protocols have also been employed to access users' virtual desktops. A virtual desktop is a virtual computing system, hosted typically by a virtualization infrastructure provided by a datacenter, that operates as a desktop or workstation computer that an end user can interact with using the remote desktop protocol and client software and/or hardware. The client software and/or hardware transmits user input such as keyboard or mouse input to the remote system to be processed there, and receives display and other data, such as sound, for presentation to the user. One problem with the use of remote desktop protocol and session access to a user's (virtual) desktop on a mobile device is that the interface is often too cumbersome for the small real estate supported by a mobile device and/or the latency for obtaining data is in some situations too much to be tolerable. Moreover, users in the office would likely prefer to use their desktops in "native" mode—that is without needing to be virtualized, if nothing else to achieve speed advantages.

To address some of these problems, applications such as "Dropbox" have been developed to provide anywhere access "cloud" storage to effectively transport files in a web accessible folder. All such files must be explicitly placed in a Dropbox folder by the user in order to be made available to another device or at another time. An advantage to such solutions is that it allows a mobile device to use cloud storage as opposed to local storage on the device for interchange of files between devices.

Other enhancements to this basic notion of web based (or cloud) storage have been developed. One such enhancement is offered by VMware's Mirage product. VMware Mirage provides a "File Portal" to a user's desktop computing environment. FIGS. 1A and 1B are illustrative screen displays from a VMware Mirage File Portal. A web browser 100 can be used on any remote client device, for example, a mobile device, to access a list 110 of the directories and their contents that are present on the user's desktop computer, for example, in her office, as long as the user's computer is centrally managed. The user's Window's "desktop directory" 112 is shown as a folder within the file system present on the user's device. FIG. 1B shows a view of the user's "desktop directory," 112 which contains a listing 120 of all of the files and subdirectories contained on the user's computer. Thus, the VMware Mirage File Portal provides an extended view of the file system on the user's computer rather than the single directory visible using Dropbox.

Solutions that have gone beyond the use of a remote desktop protocol, however, do nothing to help a user maintain context from using one device to the next.

DETAILED DESCRIPTION

Figure 1A:
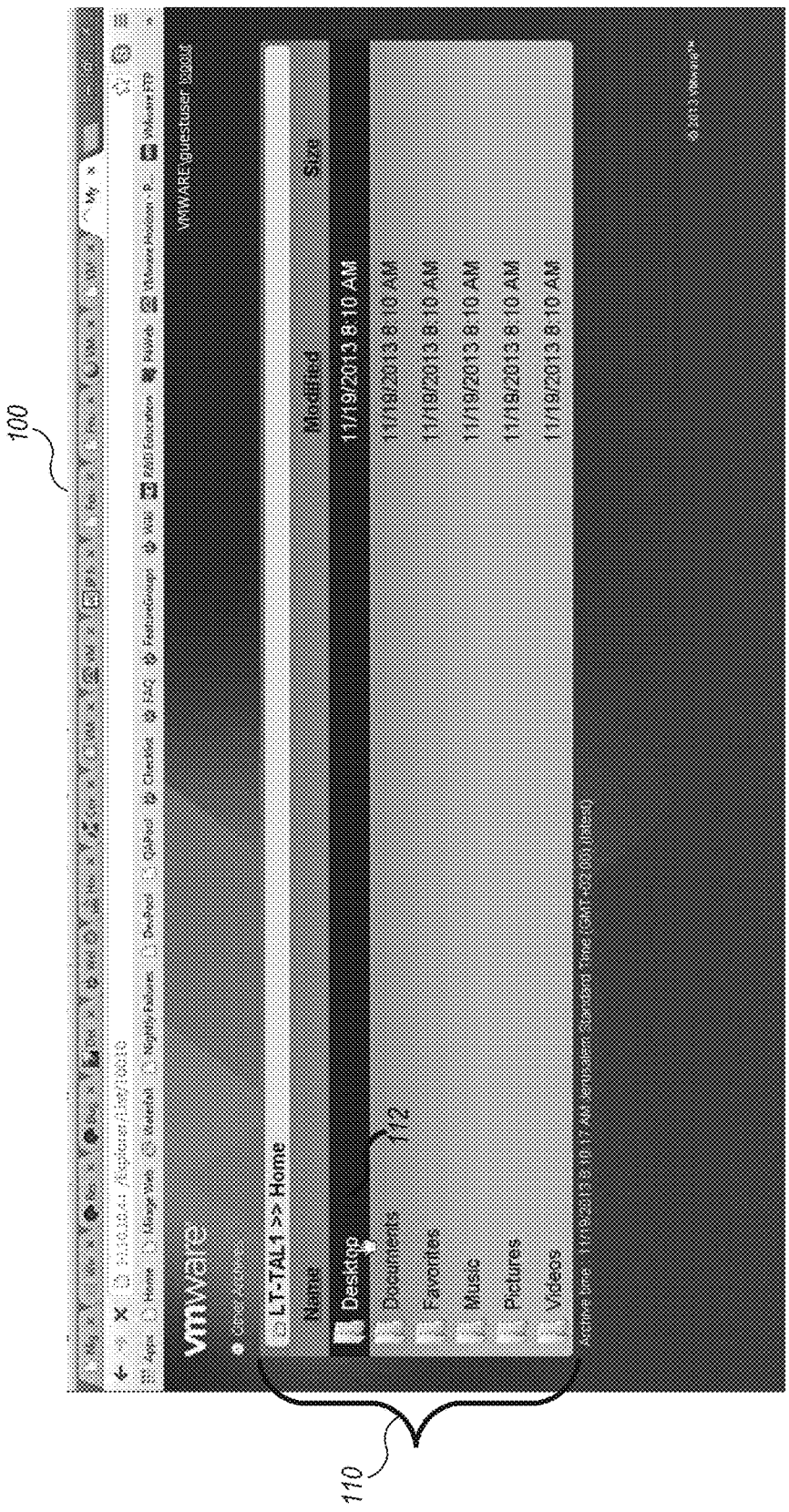
FIGS. 1A and 1B are illustrative screen displays from a VMware Mirage File Portal.
Figure 1B:

Embodiments described herein provide enhanced computer- and network-based methods, systems, and techniques for providing contextual access to a MICROSOFT WINDOWS, or other, operating system desktop user interface executing remotely, without the overhead or use of stateful connections that use remote desktop protocols to maintain state information about the desktop to which the user is connected. Example embodiments provide a Remote Contextual Access System ("RCAS"), which enables users to view what they are presently doing on a "desktop" of their physical computing machines from remote devices such as mobile phones, laptops, or tablets without the overhead of establishing a remote session or connection (e.g., without use of a remoting protocol to connect) to the machine running the desktop and without the need to represent the high resolution of a desktop on a lower resolution device such as a mobile device. In addition, the RCAS enables users to use facilities available on the mobile device, such as a touch user interface, with versions of a desktop not designed to take advantage of or understand those facilities. Here, use of the word "desktop" refers to a user interface ("UI") associated with an operating system running on the user's physical computer. Today's desktop UIs are typically graphical UIs (or "GUI"s). Throughout, example embodiments of a RCAS will be described with reference to a MICROSOFT® WINDOWS® operating system desktop and may be referred to simply as the "desktop" or "WINDOWS desktop." One could modify the techniques provided here to work with desktops of other graphical user interfaces and other operating systems, providing tools exist or could be developed to translate state information as described further herein to a format immediately accessible to an off-the-shelf web browser (e.g., HTML). For the purpose of simplification, the machine the user is using to execute the desktop she wishes to proliferate to mobile devices is referred to herein simply as the user's desktop machine, although there may be more than one such desktop in use.

The RCAS provides a process by which continual or periodic snapshots of state information of a user's desktop are stored in a central server by an agent running on the user's desktop machine. The purpose being to resurrect the context of the items being presented or used on the user's desktop on a remote mobile device, without requiring any kind of direct connection or session (e.g., without use of a remoting protocol to connect) from the remote mobile device to the user's desktop machine, simply using a native browser available via a web connection on the remote mobile device.

A remote mobile device may include any type of device capable of operating in a wire-free environment, including for example, a cell phone, a smart phone, a tablet, a laptop, and the like. A native browser refers to a web browser capable of rendering "html" and may also be referred to as a standard browser or an "off-the-shelf" browser.

To provide this remote contextual capability, an agent (e.g., program, code, logic, task, thread, etc.) running on the user's desktop machine uploads (e.g., harvests, determines, captures, etc.) state information regarding the state of the user's desktop executing of the desktop machine to a central server. This information may be uploaded on a predetermined basis, continually, periodically, frequently, at intervals, or by any measure that may be specifiable or configurable. The agent uses tools to translate some of the captured information to a format native to a web browser (e.g., "html") so that a receiving browser can render the user's desktop without further processing. In some embodiments the operating system and various application tools provide translation tools to capture and translate objects on the user's desktop for later web-accessible mobile access. In other embodiments, the translation of the content may be performed on the central server after it has been uploaded by the agent.

In addition, in other embodiments, the agent uses tools to translate the information to any format capable of being displayed by a receiving application running on a mobile device. For example, mobile devices running an iOS or Android operating system may support native applications that can similarly display remote context as described herein.

In one embodiment, the types of context that are harvested (captured, mined, determined, and the like) include open documents, such as MICROSOFT OFFICE word processing documents, spreadsheets, presentations and the like, links, links and documents shared from other users, recent and currently active documents, web browser history and bookmarks, calendared events, contacts, email, and the like. In essence, any object that is translatable into html using Microsoft Office API, Mail API (MAPI) or other APIs may be captured.

Figure 2:
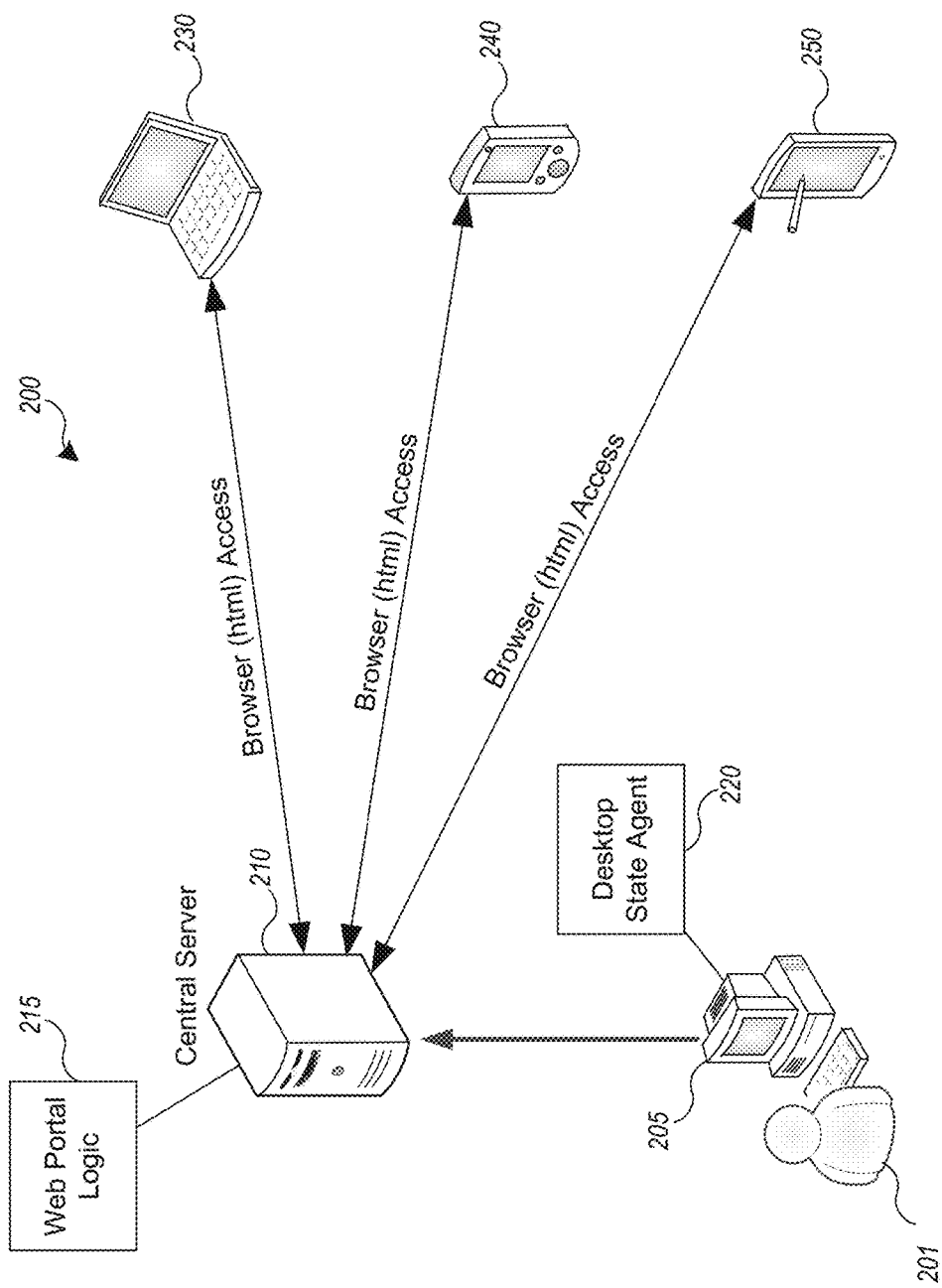
FIG. 2 is an example block diagram of an example environment for practicing remote contextual access as provided by a Remote Contextual Access System.

FIG. 2 is an example block diagram of an example environment for practicing remote contextual access as provided by a Remote Contextual Access System. The remote contextual access environment 200 provides a user 201 with a way to access (currently) what is running on the user's desktop on the desktop machine 205 using any one of a number of mobile devices, including tablet 250, smart phone 240, and laptop 230, without connecting from the mobile device 230, 240, and 250 to the user's desktop machine 205. A desktop state agent 220 executes on the user's desktop machine 205 and provide periodic state information (data, for example, what documents are open or have recently been edited) to a central server 210. The central server 210, through the support of web portal logic 215 provides, to any of the mobile devices 230, 240, and 250 when they access the web portal (e.g., by accessing a particular web page), access to the stored state information. The information that has been translated to html is able to be rendered directly on the mobile devices through standard web browsers, for example, Internet Explorer, Chrome, Firefox, and Safari, executing on the mobile devices. In this manner a user can switch quickly to one of her mobile devices, such as smart phone 240, and still be able to read or edit the last document or email she was reading when she was sitting at her desktop machine 205.

Figure 3A:
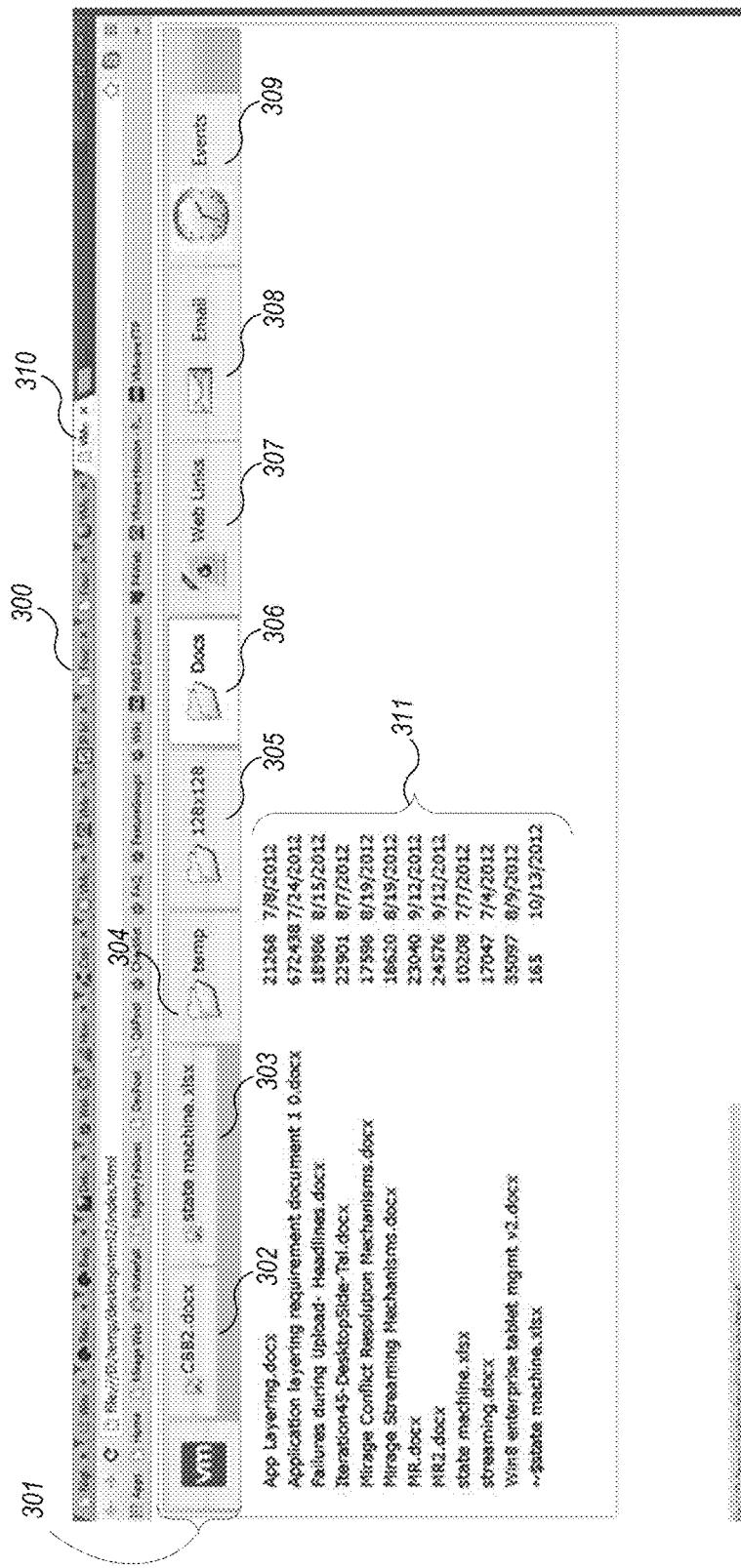
FIGS. 3A and 3B are example screen displays of an example user interface provided by a Remote Contextual Access System.
Figure 3B:
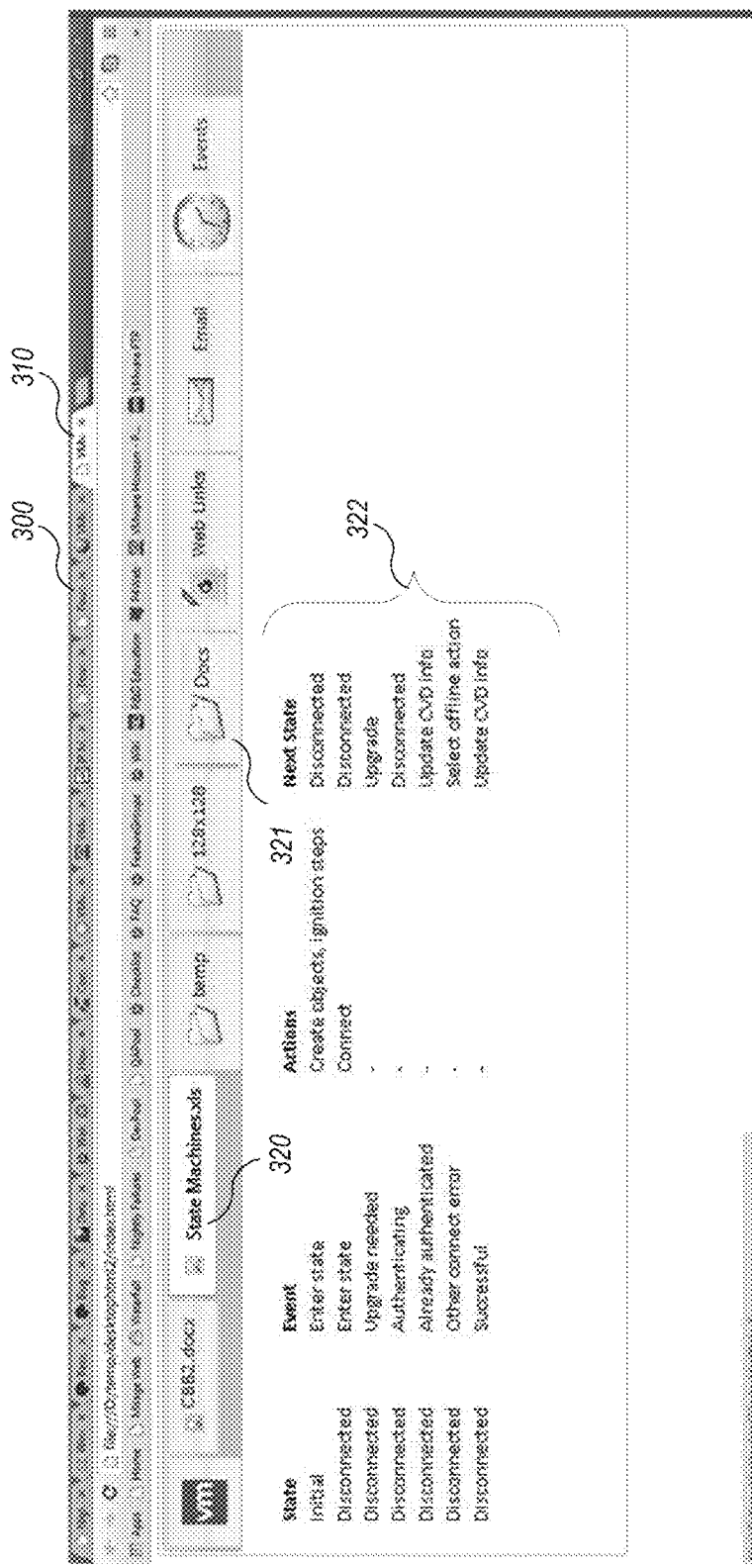

FIGS. 3A and 3B are example screen displays of an example user interface provided by a Remote Contextual Access System. In FIG. 3A, browser display area 300 is shown presenting one or more tabs, e.g., tab 310, as might be displayed using a standard web browser on one of the remote devices 230, 240, and 250 shown in FIG. 2. Here, the web browser is Chrome, although any standard web browser that can render "html" or any other format to which content is translated would be usable for this purpose. The remote desktop interface as provide by the RCAS techniques is presently rendered in tab 310. Eight "desktop tabs" in desktop tab bar 301 are being displayed that reflect a current state of corresponding content of a desktop running on the user's desktop machine. The desktop tabs include for example, a desktop tab 302 indicating an open document "CBB2.docx;" a desktop tab 302 rendering (e.g., presenting, showing, displaying, etc.) the content of an Excel spreadsheet called "State Machine.xls;" a desktop tab 304 rendering an open folder called "temp;" a desktop tab 305 rendering a folder of open images called "128×128;" a desktop tab 306 rendering an open folder "Docs;" a desktop tab 307 rendering one or more links that are accessible from the user's desktop; a desktop tab 308 rendering a folder for recent emails; and a desktop tab 309 rendering a folder for upcoming calendar events, harvested from a mail/calendaring program running on the user's desktop. In other embodiments of the RCAS, other desktop tabs or other presentations of the user's desktop content may be made available.

As currently rendered, the desktop tab 306 contains a list of all of the open documents on the user's desktop running on the user's desktop machine (e.g., machine 205 in FIG. 2). List 311 contains a list of all of these open documents (as links). When the user selects one of these links in list 311, a new desktop tab is opened with the content of that document. For example, if a user selects the "state machine.xls" link from list 311, then the UI presented in FIG. 3B is displayed. Note as well that the desktop tab whose contents are being featured is emphasized in some form, for example, here a highlight on the background of tab 306.

In FIG. 3B, the desktop tab 320 for viewing the contents of spreadsheet called "State Machine.xls" is displayed as a currently selected tab (the background of the tab is highlighted). Of note, the background of the open documents tab 321 has ceased to be emphasized as it is no longer the currently selected tab.

Other user interfaces for rendering the html state of the current documents, links, and bookmarks on the user's desktop would be appropriate.

Although the techniques of RCAS are generally applicable to any type of desktop or browser, the phrase "standard browser" is used generally to imply any type of web browser that is not explicitly modified to understand any intricacies of the user's desktop—it is only programmed to render html (or other format/language). In addition, as mentioned, the techniques of RCAS are also applicable to other applications native to a mobile device that are not modified to understand any intricacies of the user's desktop—only programmed to render html or other format/language utilized by the RCAS to make a user's desktop accessible on the mobile device. Also, although certain terms are used primarily herein, other terms could be used interchangeably to yield equivalent embodiments and examples. In addition, terms may have alternate spellings which may or may not be explicitly mentioned, and all such variations of terms are intended to be included.

Figure 4:
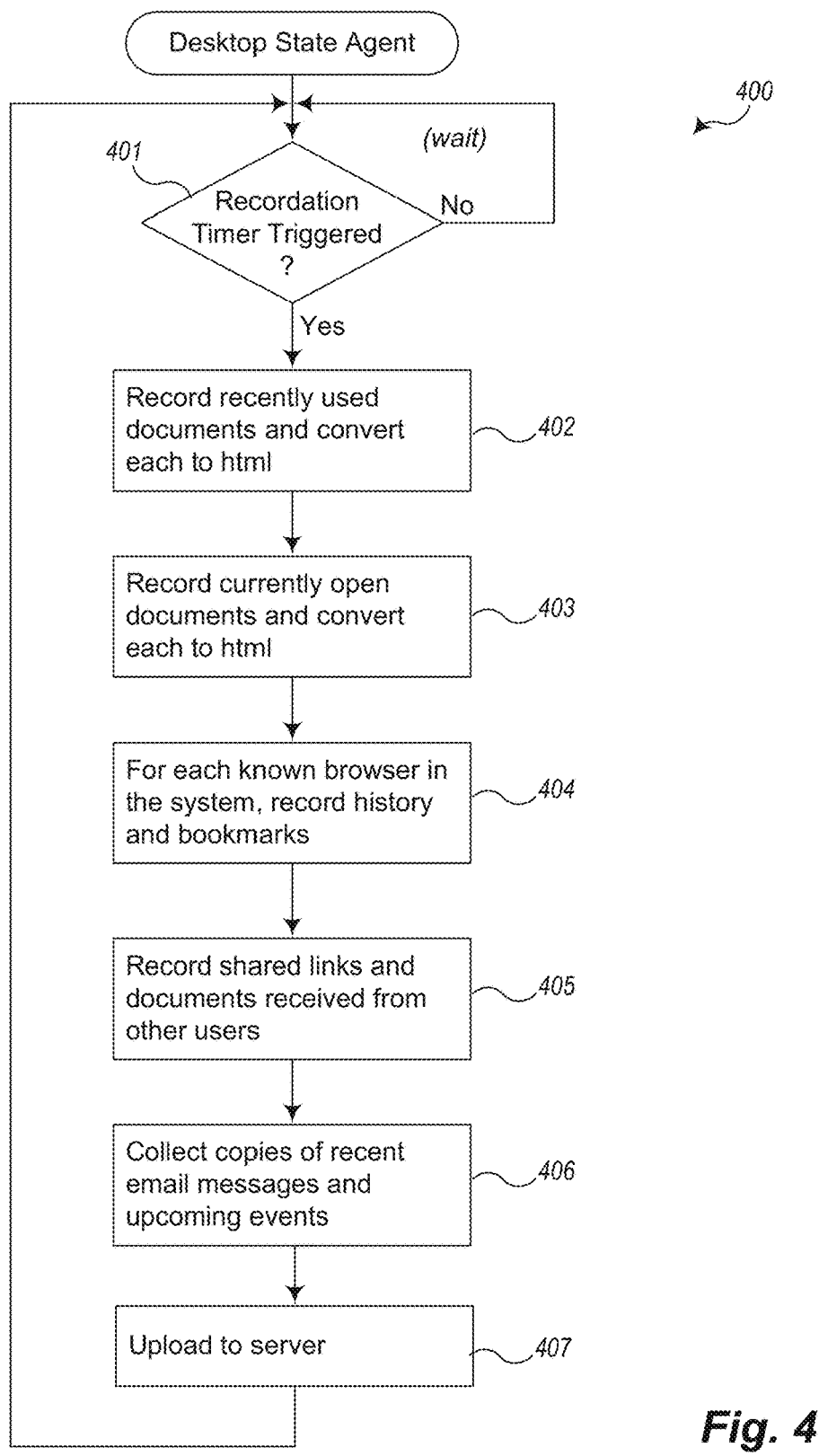
FIG. 4 is an example flow diagram of logic provided by a Desktop State Agent of an example Remote Contextual Access System.

Example embodiments described herein provide applications, tools, data structures and other support to implement a Remote Contextual Access System to be used for providing remote mobile access to a user's Windows operating system desktop without using a remoting protocol such as RDP or PCoIP. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like FIG. 4 is an example flow diagram of logic provided by a Desktop State Agent of an example Remote Contextual Access System. As described with reference to FIG. 2, the desktop state agent executes on a user's desktop machine to provide data for rendering in the browser on the remote mobile device. In one embodiment, the agent operates in an event driven manner, triggered by a timer or other mechanism that lets the agent know when it is appropriate to harvest and store data from the user's desktop. The triggering event may be at periodic or frequent or designate times, days of week, hours, or the like, or loosely once every x minutes, or when the user isn't actively typing, etc. Further, in some embodiments, the triggering event is configurable.

In block 401, when the triggering event occurs, the desktop state agent logic proceeds to harvest and record different types of information. Specifically, in block 402, the logic records recently used documents and converts each to html. In block 403, the logic records currently open documents and converts each to html (again, in some embodiments, the translation may be performed at the central server end). In block 404, for each known browser available on the user's desktop machine, the logic records the browser history and bookmarks. In block 405, the logic records shared links and documents received from other users. In block 406, the logic collects copies of recent email messages and upcoming events from a user's calendar, and converts each to html. Other types of desktop information may also be harvested such as saved passwords (e.g., for websites), content of open desktop windows, printer configurations, files from network shares (in addition to those local to the desktop, contacts, and the like. Other information, such as any desktop resource that is part of a user's desktop, even if not explicitly mentioned here may also be harvested. In one example RCAS, these tasks are performed using Microsoft's MAPI or Microsoft Office API and/or tools.

After all of the harvesting and translating (to html) is done, the logic uploads the translated data and the harvested data not yet translated to a central server such as server 210 of FIG. 2.

Figure 5:
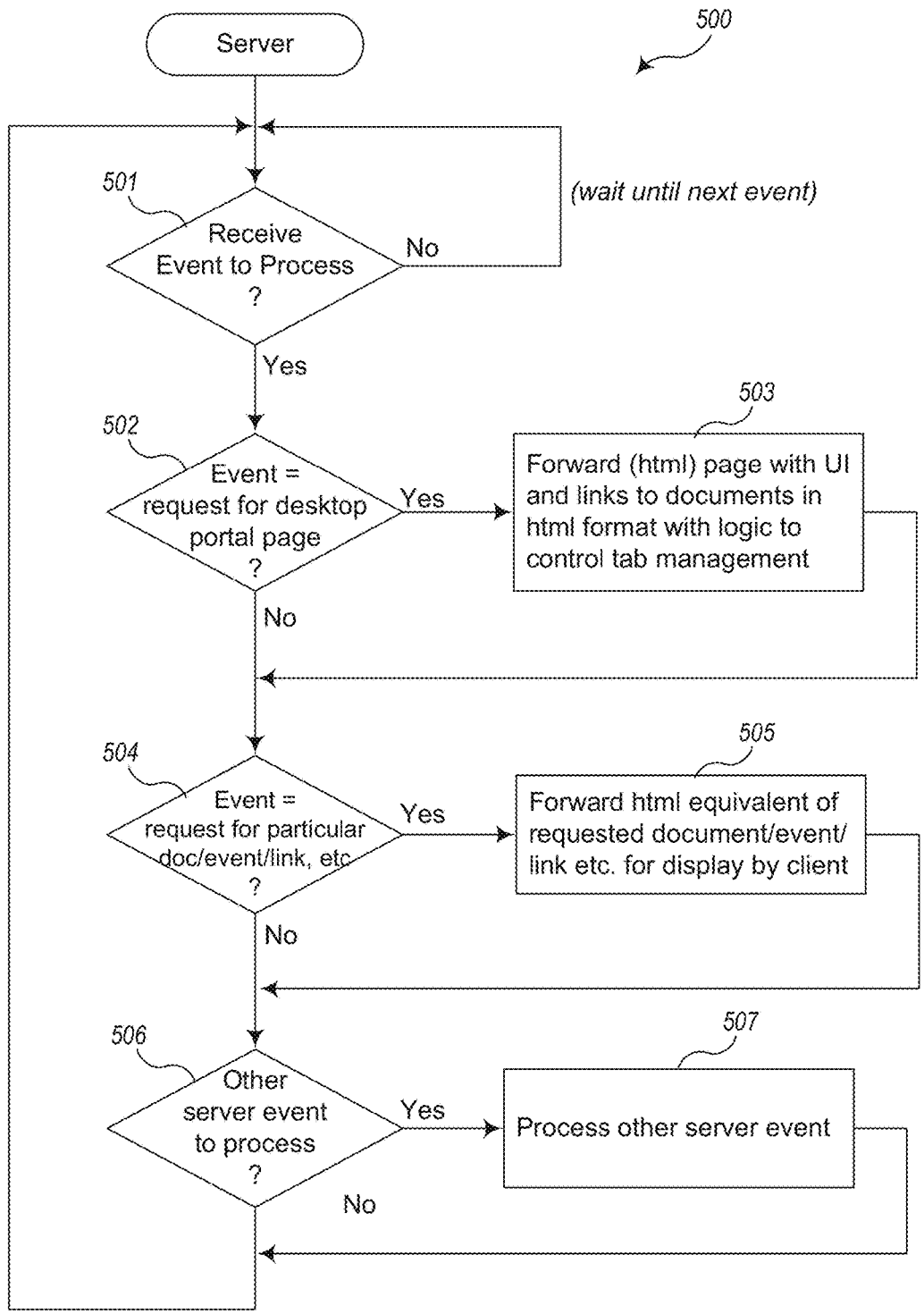
FIG. 5 is example flow diagram of logic provided by a server of an example Remote Contextual Access System.

FIG. 5 is example flow diagram of logic provided by a server of an example Remote Contextual Access System. In this example server side RCAS implementation, the logic is presented as an event handler, although other organizations of the logic are possible.

Specifically, in block 501, the logic determines whether it has received an event to process, and if so, continues in block 502, otherwise waits for an event. In block 502, the logic determines whether a request for a desktop portal page has been received (for example, from a mobile device), and if so, continues in block 503, otherwise continues in block 504. In block 503, the logic forwards an (html) page with UI and links to documents in html format with the logic to control the UI being rendered (e.g., the desktop tab interface shown in FIGS. 3A and 3B).

In block 504, the logic determines whether it has received a request for a particular document or link, and if so, continues in block 505, otherwise continues in block 506. In block 505, the logic forwards the html equivalent (translated version) of the requested document, event, or link, etc. for rendering by the client.

In block 506, the logic determines whether there is some other type of server event to process, and if so, continues in block 507 to process the other event, otherwise returns to the beginning of the logic in block 501 to wait until the next event occurs.

Different logic can be equivalently implemented to produce a RCAS that operates in the manners described herein.

Figure 6:
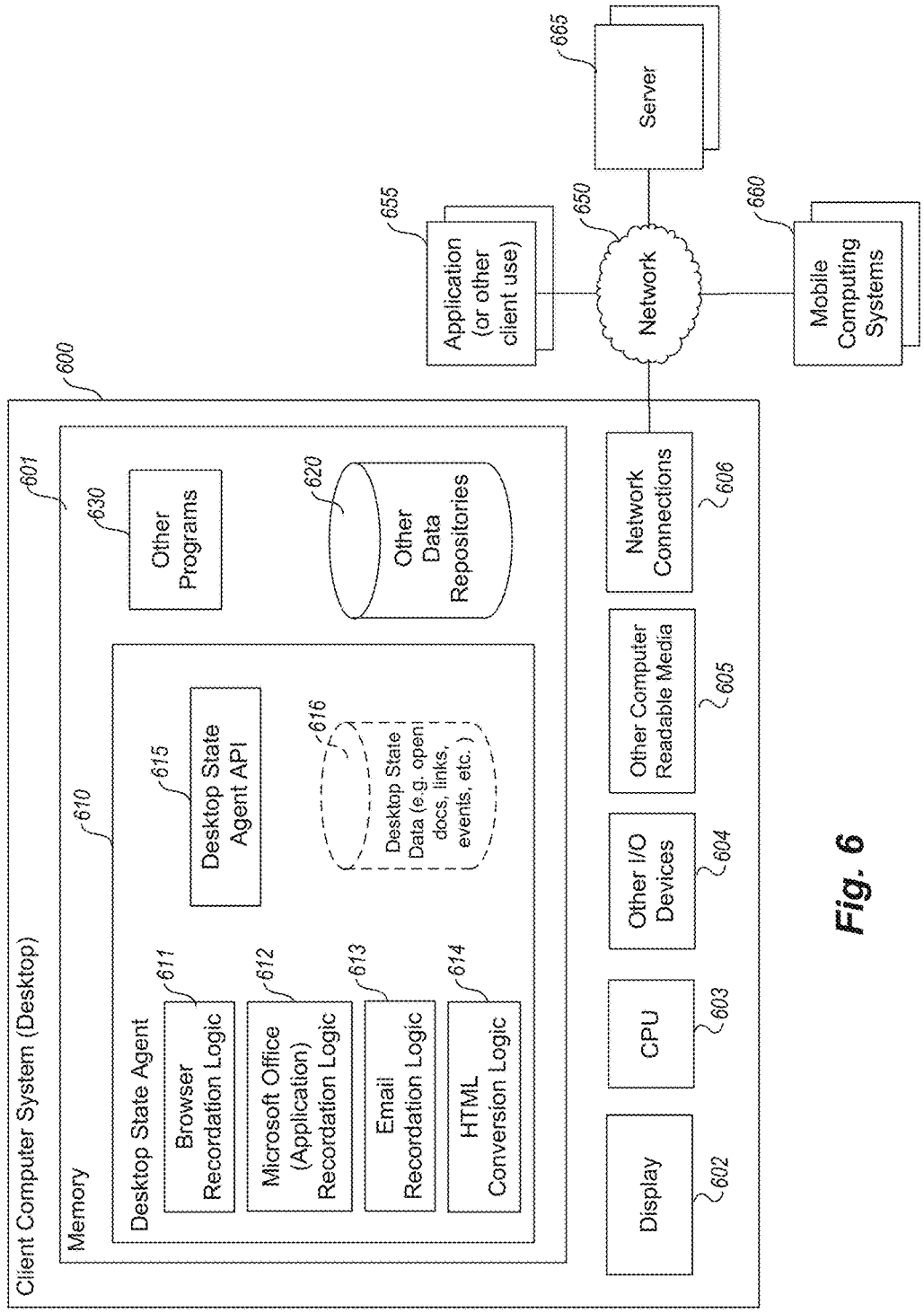
FIG. 6 is an example block diagram of a computing system for practicing embodiments of a Remote Contextual Access System.

FIG. 6 is an example block diagram of a computing system for practicing embodiments of a client portion of a Remote Contextual Access System. Note that a general purpose virtual or physical computing system suitably instructed or a special purpose computing system may be used to implement an RCAS. Further, the Remote Contextual Access System may be implemented in software, hardware, firmware, or in some combination to achieve the capabilities described herein. (The server portion, not shown, can be implemented similarly on a general purpose computing system suitably instructed or a special purpose computing system.)

The computing system 600 may comprise one or more server and/or client computing systems and may span distributed locations. In addition, each block shown may represent one or more such blocks as appropriate to a specific embodiment or may be combined with other blocks. Moreover, the various blocks of the Remote Contextual Access System 610 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display, etc.), other computer-readable media 605, and one or more network connections 606. The RCAS 610 is shown residing in memory 601. In other embodiments, some portion of the contents, some of, or all of the components of the RCAS 610 may be stored on and/or transmitted over the other computer-readable media 605. The components of the Remote Contextual Access System 610 preferably execute on one or more CPUs 603 and manage the generation and use of desktop state information, as described herein. Other code or programs 630 and potentially other data repositories, such as data repository 606, also reside in the memory 601, and preferably execute on one or more CPUs 603. Of note, one or more of the components in Figure Y may not be present in any specific implementation. For example, some embodiments embedded in other software may not provide means for user input or display.

In a typical embodiment, the RCAS 610 includes one or more browser recordation logic 611, one or more application recordation logic (e.g., MICROSOFT OFFICE recordation logic) 612, email recordation logic 613, and HTML conversion logic 614. In at least some embodiments, the some of the components are provided external to the RCAS and are available, potentially, over one or more networks 650. Other and/or different modules may be implemented. In addition, the RCAS may interact via a network 650 with application or client code 655 that uses information or translations computed by the RCAS 610, one or more client computing systems 660, and/or one or more third-party information provide systems 665. Also, of note, the desktop state data repository 616 is typically stored on the central server (hence shown in dashed lines) but may be provided external to the client side RCAS as well, for example in a knowledge base accessible over one or more networks 650. The data repository 616 may also store temporary state information locally before it is translated or uploaded to the server.

In an example embodiment, components/modules of the RCAS 610 are implemented using standard programming techniques. For example, the RCAS 610 may be implemented as a "native" executable running on the CPU 103, along with one or more static or dynamic libraries. In other embodiments, the RCAS 610 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces 615 to the data stored as part of the RCAS 610 (e.g., in the data repositories 616) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 616 may be implemented as one or more database systems, file systems, or any other technique for storing such information, or any combination of the above, including implementations using distributed computing techniques.

Also the example RCAS 610 may be implemented in a distributed environment comprising multiple, even heterogeneous, computer systems and networks. Different configurations and locations of programs and data are contemplated for use with techniques of described herein. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an RCAS.

Furthermore, in some embodiments, some or all of the components of the RCAS 610 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FP-GAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the present disclosure. For example, the methods and systems for performing contextual access discussed herein are applicable to other architectures other than a WINDOWS or iOS operating system architecture. Also, the methods and systems discussed herein are applicable to differing protocols, communication media (optical, wireless, cable, etc.) and devices (such as wireless handsets, electronic organizers, personal digital assistants, tablets, portable email machines, game machines, pagers, navigation devices such as GPS receivers, etc.)

The invention claimed is:

1. A method, comprising:
receiving, at a central server, from a remote computing device, desktop state information regarding a captured state of a desktop of the remote computing device that is harvested and uploaded to the central server at designated times by an agent executing in the background on the remote computing device;
receiving a request from a remote mobile device for a desktop portal page corresponding to the desktop; and
in response to the request, forwarding the desktop portal page to the remote mobile device, wherein the desktop portal page is configured to, when opened in a web browser, present at least a portion of the desktop state information to provide a user of the remote mobile device access to the captured state of the desktop through the web browser, without establishing a remote desktop session with the remote computing device.

2. The method of claim 1, wherein the desktop portal page is a hypertext markup language (HTML) page with a user interface (UI) and links to documents in html format with a logic to control the UI being rendered.

3. The method of claim 1, further comprising receiving a second request from the remote mobile device for at least one of a document, event, or a link referenced in the desktop portal page; and
in response to the second request, retrieving the at least one of the document, event, or link from the desktop state information and forwarding it to the remote mobile device.

4. The method of claim 3, further comprising translating the at least one of the document, event, or link to a format that is presentable by the web browser on the remote mobile device before forwarding it to the remote mobile device.

5. The method of claim 1, wherein at least a portion of the desktop state information is received in a format that is presentable by the web browser on the remote mobile device.

6. The method of claim 1, further comprising, translating at least a portion of the received desktop state information into a format that is presentable by the web browser on the remote mobile device.

7. The method of claim 1, wherein the desktop state information comprises information regarding one or more open or recently used documents or links, wherein a recently used document is a document that was used by the user within a predetermined period of time prior to the capturing of the desktop state information.

8. A computing system, comprising:
at least one processor; and
memory including instructions that, when executed by the at least one processor, cause the computing system to perform the steps of:
receiving, at a central server, from a remote computing device, desktop state information regarding a captured state of a desktop of the remote computing device that is harvested and uploaded to the central server at designated times by an agent executing in the background on the remote computing device;
receiving a request from a remote mobile device for a desktop portal page corresponding to the desktop; and
in response to the request, forwarding the desktop portal page to the remote mobile device, wherein the desktop portal page is configured to, when opened in a web browser, present at least a portion of the desktop state information to provide a user of the remote mobile device access to the captured state of the desktop through the web browser, without establishing a remote desktop session with the remote computing device.

9. The computing system of claim 8, wherein the desktop portal page is a hypertext markup language (HTML) page with a user interface (UI) and links to documents in html format with a logic to control the UI being rendered.

10. The computing system of claim 8, wherein the memory further includes instructions that when executed by the at least one processor, cause the computing device to perform the steps of:
receiving a second request from the remote mobile device for at least one of a document, event, or a link referenced in the desktop portal page; and
in response to the second request, retrieving the at least one of the document, event, or link from the desktop state information and forwarding it to the remote mobile device.

11. The computing system of claim 10, wherein the memory further includes instructions that when executed by the at least one processor, cause the computing device to perform the steps of:
translating the at least one of the document, event, or link to a format that is presentable by the web browser on the remote mobile device before forwarding it to the remote mobile device.

12. The computing system of claim 8, wherein at least a portion of the desktop state information is received in a format that is presentable by the web browser on the remote mobile device.

13. The computing system of claim 8, wherein the memory further includes instructions that when executed by the at least one processor, cause the computing device to perform the steps of:
translating at least a portion of the received desktop state information into a format that is presentable by the web browser on the remote mobile device.

14. The computing system of claim 8, wherein the desktop state information comprises information regarding one or more open or recently used documents or links, wherein a recently used document is a document that was used by the user within a predetermined period of time prior to the capturing of the desktop state information.

15. A non-transitory computer readable storage medium comprising one or more sequences of instructions, the instructions when executed by one or more processors causing the one or more processors to execute the operations of:

receiving, at a central server, from a remote computing device, desktop state information regarding a captured state of a desktop of the remote computing device that is harvested and uploaded to the central server at designated times by an agent executing in the background on the remote computing device;

receiving a request from a remote mobile device for a desktop portal page corresponding to the desktop; and in response to the request, forwarding the desktop portal page to the remote mobile device, wherein the desktop portal page is configured to, when opened in a web browser, present at least a portion of the desktop state information to provide a user of the remote mobile device access to the captured state of the desktop through the web browser, without establishing a remote desktop session with the remote computing device.

16. The non-transitory computer readable storage medium of claim 15, wherein the desktop portal page is a hypertext markup language (HTML) page with a user interface (UI) and links to documents in html format with a logic to control the UI being rendered.

17. The non-transitory computer readable storage medium of claim 15, further comprising instructions that when executed by the one or more processors cause the one or more processors to execute the operations of:

receiving a second request from the remote mobile device for at least one of a document, event, or a link referenced in the desktop portal page; and in response to the second request, retrieving the at least one of the document, event, or link from the desktop state information and forwarding it to the remote mobile device.

18. The non-transitory computer readable storage medium of claim 17, further comprising instructions that when executed by the one or more processors cause the one or more processors to execute the operations of:

translating the at least one of the document, event, or link to a format that is presentable by the web browser on the remote mobile device before forwarding it to the remote mobile device.

19. The non-transitory computer readable storage medium of claim 15, wherein at least a portion of the desktop state information is received in a format that is presentable by the web browser on the remote mobile device.

20. The non-transitory computer readable storage medium of claim 15, further comprising instructions that when executed by the one or more processors cause the one or more processors to execute the operations of:

translating at least a portion of the received desktop state information into a format that is presentable by the web browser on the remote mobile device.

\* \* \* \* \*